United States Patent [19]

Molitor

[11] Patent Number: 5,301,711
[45] Date of Patent: Apr. 12, 1994

[54] FLOW CONTROL AND MEASUREMENT DEVICE

[76] Inventor: Arvid A. Molitor, 1101 Florimond Dr., Elgin, Ill. 60123

[21] Appl. No.: 100,326
[22] Filed: Aug. 2, 1993
[51] Int. Cl.[5] .............................................. G05D 7/01
[52] U.S. Cl. ..................................... 137/119; 137/504; 137/538
[58] Field of Search ................. 137/118, 119, 504, 538

[56] References Cited

U.S. PATENT DOCUMENTS

| | | | |
|---|---|---|---|
| 2,845,086 | 7/1958 | Waterman | 137/504 |
| 4,226,365 | 10/1980 | Norris | 137/118 X |
| 4,552,172 | 11/1985 | Krieger | 137/538 |

Primary Examiner—Robert G. Nilson
Attorney, Agent, or Firm—Kinzer, Plyer, Dorn, McEachran & Jambor

[57] ABSTRACT

A flow distribution and control device for connection to a fluid supply includes an inlet assembly and an outlet assembly. A valve member is positioned in a flow path between the inlet and outlet assemblies and moves to an open position in response to increased differential pressure between the inlet and outlet assemblies. Discharge holes selectively permit communication between the inlet and outlet assemblies when the valve member is in the open position. A cylindrical flow distribution ring seated in the outlet assembly defines a radial collector gap that has a larger diameter than that of adjacent radial interior surfaces of the ring and inlet assembly. The flow path is open when the valve member is in an open position and at least one of the discharge holes is exposed to the collector gap.

10 Claims, 4 Drawing Sheets

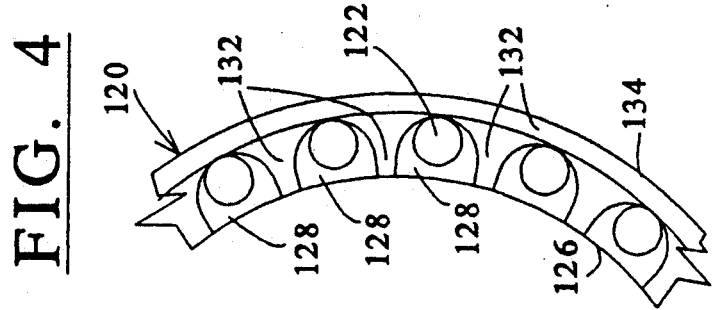
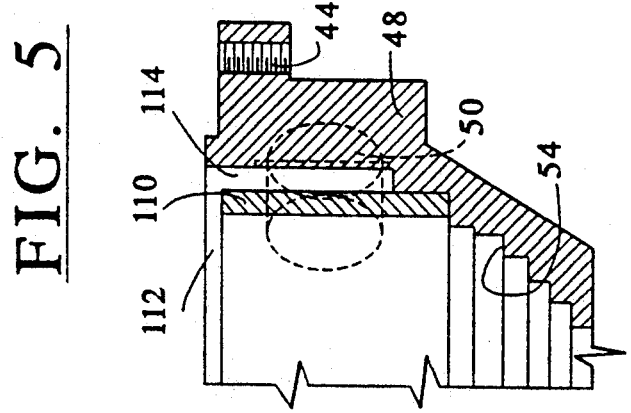
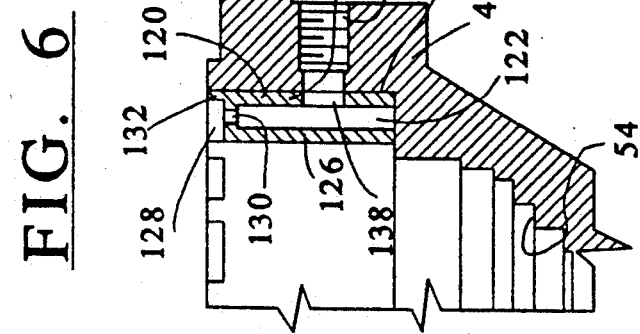

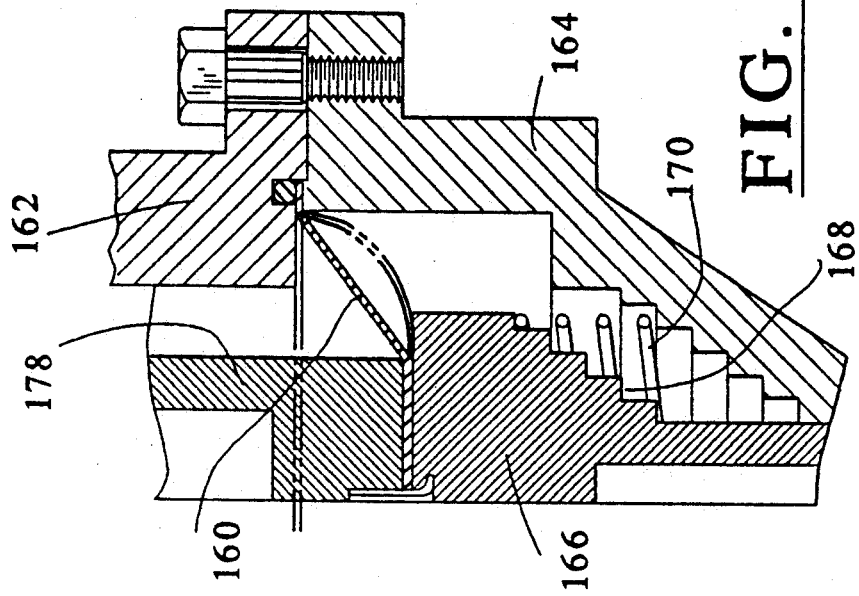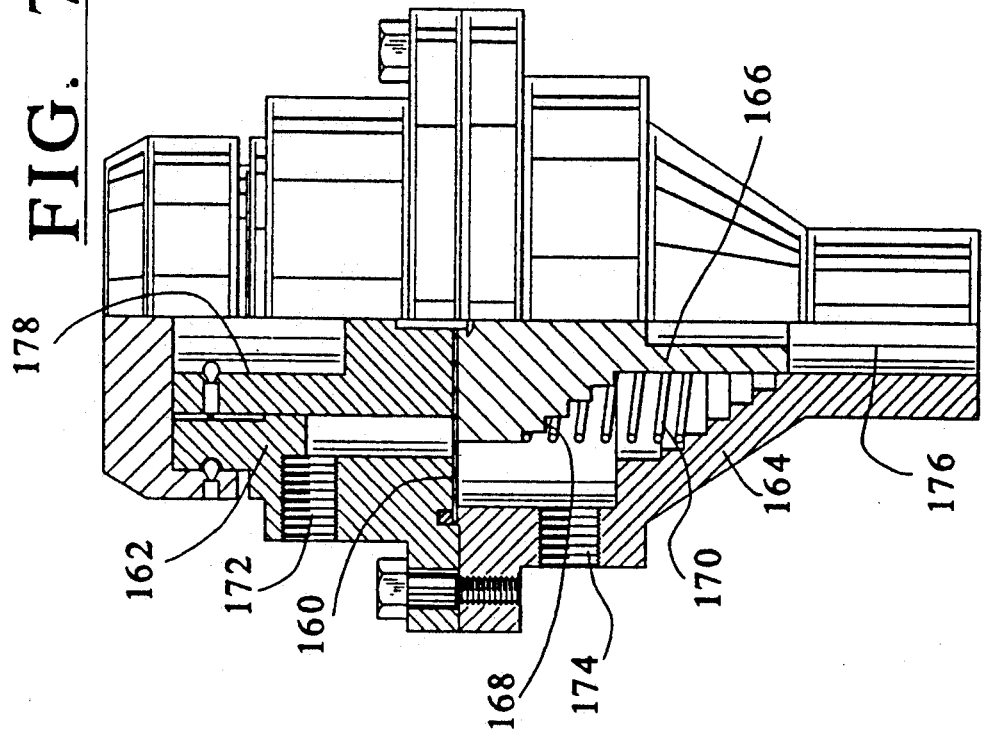

FLOW CONTROL AND MEASUREMENT DEVICE

BACKGROUND OF THE INVENTION

This invention relates to a flow control and measurement device that is adapted to be connected to a pipeline or another fluid supply.

The present invention is extremely versatile, permitting performance of multiple functions with a small number of components. In one embodiment, the invention functions as a flow distribution valve. Flow entering the valve may be separated and distributed to as many as 24 separate output ports. The potential applications are numerous. The valve may be used to distribute controlled amounts of a lubricant supply to as many as 24 bearings or other machine parts. In another application, a constant output flow rate may be maintained irrespective of changes in incoming fluid pressure. In yet another application, the valve is used to separate fluids of various specific gravities contained in a tank according to the specific gravities of the individual fluids within the tank. Many other applications are envisioned.

The invention also functions as a flow control valve. The rate of flow through valve is a function of the pressure between the inlet and outlet portions. Below a certain pressure, the valve shuts off. Flow does not occur through the valve at all. Conventional flow valves often cannot detect flow rates below 0.3 to 0.5 gallons per minute. Small leaks can persist undetected in such valves, resulting in substantial waste of water. The present valve is advantageous in that flow is not allowed at very flow rates. Small, often hard to detect, leaks are eliminated. The flow control and flow distribution attributes of this valve may be combined, with flow occuring only above a particular pressure and with that flow being distributed among as many as 24 outlets.

The invention may also be utilized as a flow meter, with the rate of flow through the device being measured. Essentially, this involves attachment of sensing means to detect downward movement of valve portion. As this movement is a function of the flow rate, an accurate measurement of the flow rate is obtained. The sensing means may be electrical, such as a potentiometer, or mechanical, such as a transparent scale positioned on the device.

Finally, the present invention may be used as a level gauge. With the inlet portion connected to pressure at the bottom of the tank and the outlet portion connected to pressure at the top of the tank, the amount of valve movement is in direct relation to the pressure at the bottom of the tank, and thus, is an indication of the level of fluid in the tank.

SUMMARY OF THE INVENTION

The present invention provides a flow control and measurement device for connection to a fluid supply which employs an inlet assembly having at least one inlet port adapted for connection to said fluid supply, and an outlet assembly attached to the inlet assembly and having at least one outlet port. A flow path is defined between the inlet and outlet ports.

A valve member is interposed in the flow path between the inlet and outlet assemblies. It is movable between at least one closed position in which the flow path is blocked and at least one open position in which the flow path is open. The valve member moves toward the open position in response to increased differential pressure between the inlet and outlet assemblies. Discharge holes formed in the valve member selectively permit communication between the inlet and outlet ports when the valve member is in the open position.

Biasing means positioned in the outlet assembly beneath the valve member apply a biasing force which moves the valve member toward the closed position in response to decreased differential pressure between the inlet and outlet assemblies.

A cylindrical flow distribution ring is seated within the outlet assembly and in the flow path. An upper extent of the cylindrical ring and a lower extent of the inlet assembly define a radial collector gap that has a larger diameter than that of adjacent radial interior surfaces of the ring and the inlet assembly. The flow path is open when the valve member is in an open position and at least one of the discharge holes is exposed to the collector gap.

BRIEF DESCRIPTION OF THE DRAWINGS

FIG. 4 is a top elevation view of the flow distribution ring of the flow distribution device of FIG. 1;

FIG. 5 is an exploded sectional view of the inlet assembly of the flow distribution device of FIG. 1;

FIG. 6 is an exploded sectional view of an inlet assembly utilizing an alternate flow distribution ring;

FIG. 7 is a partial sectional view of another embodiment of the present invention;

FIG. 8 is an exploded sectional view of the inlet assembly of FIG. 7;

DETAILED DESCRIPTION OF THE INVENTION

Figures 1, 2, 3:
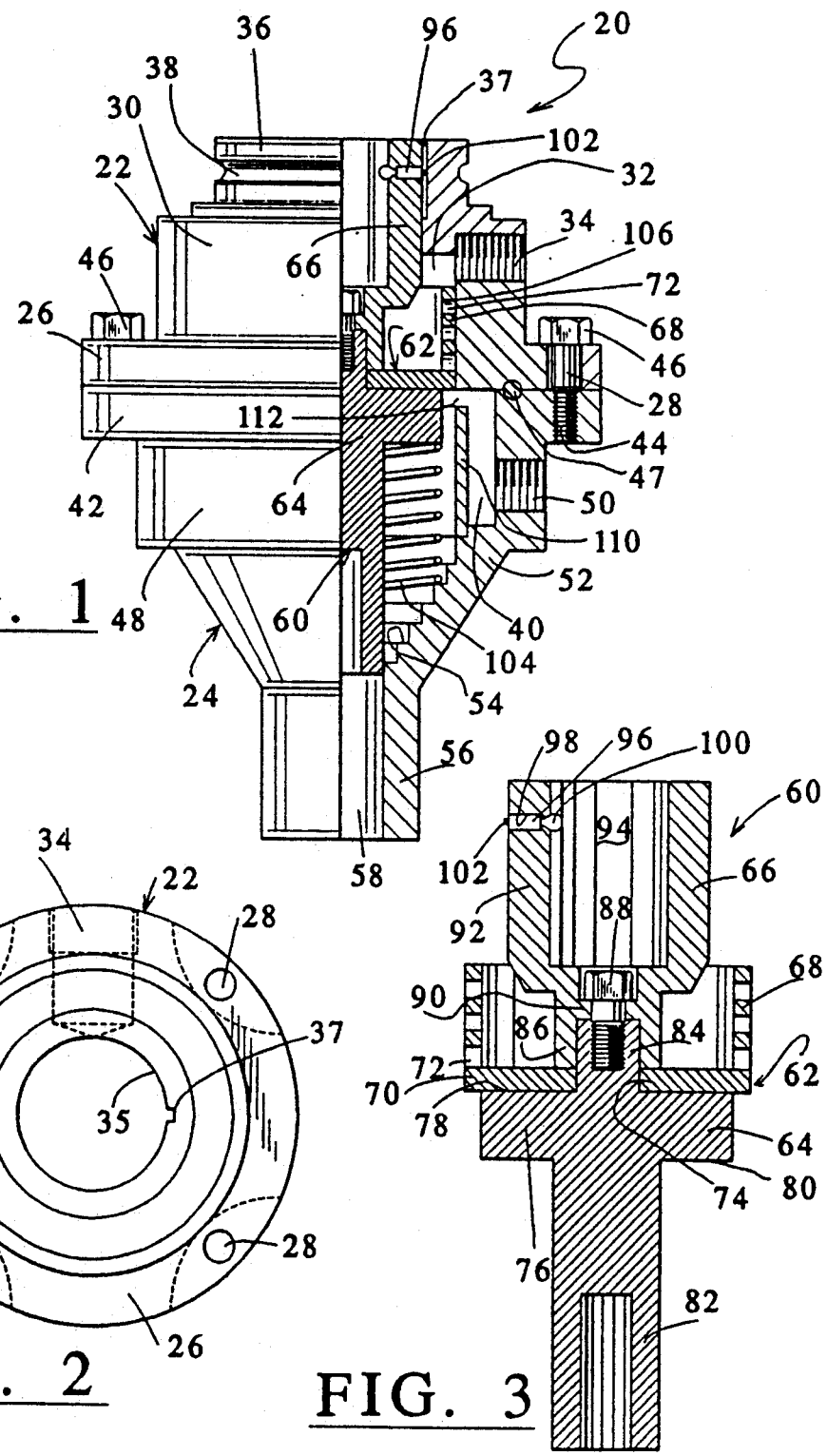
FIG. 1 is a partial sectional view of a flow distribution device according to the present invention.
FIG. 2 is a top elevation view of the inlet asembly of the flow distribution device of FIG. 1.
FIG. 3 is a sectional view of the piston assembly of the flow distribution device of FIG. 1.

A flow control and measurement device embodying the principles of this invention is illustrated in FIG. 1. Designated 20, the device includes an inlet assembly 22 and an outlet assembly 24.

Inlet assembly 22 is generally cylindrical and hollow, defining an inlet bore 32. It includes a base ring 26 having four threaded holes 28 (see FIG. 2) for attachment to outlet assembly 24. An inlet body 30 extends from base ring 26 and defines an enlarged portion of bore 32. One or more circumferentially spaced inlet ports are formed in inlet body 30. The inlet ports are threaded to permit communication with fluid supplies. One such port is shown at 34. A top portion 36 of inlet assembly 22 is positioned above inlet body 30 and defines an open-ended portion of bore 32. As is best seen in FIG. 2, a vertical keyway 37 is formed in a radially inner wall 35 of top portion 36, the purpose of which will be described in more detail herein. A groove 38 formed in the outer periphery of top portion 36 permits attachment of a cap or cover (see FIG. 7) to close off bore 32.

Outlet assembly 24 is positioned below inlet assembly 22. The outlet assembly is also hollow and generally cylindrical, defining an outlet bore 40. A base ring 42 formed at the top of outlet assembly 24 includes four threaded holes 44 (one of which is shown). Threaded holes 44 are aligned with threaded holes 28 of inlet assembly 22. A bolt or screw 46 is then threaded through holes 28 and 44 to hold the inlet and outlet assemblies together. 0-ring 47 provides a fluid seal at the junction of the inlet and outlet assemblies.

Outlet assembly 24 further includes an outlet body 48 which defines an enlarged portion of outlet bore 40. Threaded outlet ports formed in outlet body 48, one of which is depicted at 50, provide a means for discharging fluids from the outlet assembly. A sloped portion 52 of outlet assembly 24 defines a series of steps 54 in the inside of the outlet assembly. Steps 54 serve as a seat for a flow distribution ring 110 and a spring 104 contained within outlet assembly, both of which will be described in more detail herein.

A bottom portion 56 of outlet assembly 24 defines a threaded, central outlet port 58. Outlet port 58 adds to the versatility of this invention. It may be utilized in lieu of outlet ports 50 where no distribution ring is employed, it may be used to expose outlet assembly 24 to a particular pressure, or it could simply be plugged and not used at all.

Valve member 60, best illustrated in FIG. 3, is positioned within device 20 and extends through both the inlet and outlet assemblies. Member 60 is composed of three elements: a piston cup 62, a piston cup support 64, and a sleeve 66.

Piston cup 62 includes a cylindrical wall 68 formed above a base 70. A plurality of circular discharge holes 72 are formed in wall 68. As will be explained herein, the number and pattern of holes 72 may be varied to achieve a desired flow distribution scheme. A mounting opening 74 is formed in the center of piston cup base 70.

Piston cup 62 is mounted on support 64. Support 64 includes an annular plate 76 which defines an upper annular shoulder 78 and a lower annular shoulder 80. An elongated cylindrical rod 82 extends downward from plate 76 and a shorter cylindrical projection 84 extends upward from plate 76. The diameter of projection 84 is approximately equal to the diameter of mounting opening 74 formed in piston cup base 70. This allows piston cup 62 to be securely mounted on piston cup 64 by inserting projection 84 through opening 74. Once mounted, base 70 of piston cup 62 rests upon and is supported by upper annular shoulder 78 of support plate 76.

After piston cup 62 has been assembled onto support 64, sleeve 66 is mounted onto support projection 84. A lower cylindrical portion 86 of sleeve 66 has an inside diameter substantially equal to the diameter of projection 84. Thus, lower portion 86 is inserted over projection 84 for a close, tight fit. This confines piston cup base 70 between lower portion 86 of sleeve 66 and upper annular shoulder 78 of support 82. A screw or bolt 88 is inserted through a bridge 90 formed across the top of sleeve lower portion 86 and into projection 84 to ensure that piston cup, support and sleeve are securely fastened together.

Above bridge 90 is an upper cylindrical portion 92 of sleeve 66. Upper portion 92 is of substantially larger diameter than lower portion 86, defining a sleeve bore 94. A guide pin 96 extends through a hole 98 formed in the upper portion 92 of sleeve 66. Guide pin 96 includes a bulb 100 extending into sleeve bore 94, and a key 102 extending exterior of sleeve 66.

Reference is made again to FIG. 1 to illustrate the postitioning of valve member 60 within device 20. Member 60 is supported within device 20 by a spring 104 (belleville type). Spring 104 is seated on one of the steps 54 and abuts against the bottom annular shoulder 80 of support 64 of valve member 60. When there is no differential pressure between the inlet and outlet assemblies, the force exerted by spring 104 forces piston cup 62 upward into inlet assembly 22.

An increase in fluid pressure in inlet assembly 22 creates a differential pressure between the inlet and outlet assemblies, causing member 60 to move downward against spring 104. Spring 104 deflects under this pressure to a point where upward spring force on valve member 60 equals downward fluid pressure force. Thus, valve member travel is a linear function of fluid pressure.

While piston cup 62 is in inlet assembly 22, cylindrical wall 68 of piston cup 62 is flush with interior cylindrical wall 106 of inlet body 22, preventing flow through discharge holes 72. Flow through holes 72 does not occur until piston cup 62 has moved a sufficient distance into outlet assembly 24 to expose the holes to the enlarged outlet bore 40.

The provision of a number of steps 54 allows the accommodation of a wide range of springs within outlet bore 40. Spring force, and thus downward deflection of valve member 60 in response to fluid or other pressure, may be varied by substituting springs of different sizes or types. If steps are added underneath bottom annular shoulder 80 of support 64, coiled springs may be accommodated (see, for example, FIG. 7).

Key 102 of guide pin 96 projects into keyway 37 formed in wall 35 of inlet assembly 22. In this manner, rotation of valve member 60 within device 20 is prevented. Piston cup 62, and discharge holes 72 formed therein, are maintained in their designated rotary position relative to outlet assembly 24.

Bulb 100 of guide pin 96 is adapted to fit into a spiral passageway formed in the exterior of a sensing device, such as a potentiometer. It is preferably made of a material such as teflon or delrin which has low contact friction. Vertical movement of the piston cup causes vertical movement of guide pin 96 and bulb 100. The coaction of bulb 100 in a spiral passageway causes rotary movement of a sensing device, which is converted into an electric signal. This signal is used to generate a digital or dial readout which is indicative of the flow rate through the device (flow rate is a function of piston travel).

Simpler means may also be used to yield an indication of the flow rate through the device. An appropriately marked transparent scale could be positioned over inlet assembly 22, and the position of bulb 100 could be noted on the scale to give an indication of the flow rate.

Flow distribution ring 110, FIGS. 1 and 5, is seated within outlet assembly 24 on one of the steps 54. It is securely press-fitted against an annular interior wall of outlet assembly 24. Ring 110 is in vertical alignment with interior wall 106 of inlet assembly 22, with an annular collector gap or space 112 being formed between the top of ring 110 and the bottom of wall 106. Gap 112 should have a width equal to the diameter of discharge holes 72 formed in piston cup 62.

In the embodiment of FIGS. 1 and 5, the flow distribution ring is simply a solid, hollow cylinder. It is employed in conjunction with a single, or common, outlet. As piston cup 62 moves downward into outlet assembly 24 in response to pressure in inlet assembly 22, discharge holes 72 are exposed to collector gap 112. When a hole is exposed to the collector gap, fluid flows out of piston cup 62, through the collector gap, into a space 114 existing between ring 110 and outlet body 48, and finally exits device 20 through outlet port 50. Flow does not occur through holes not exposed to the collector gap. Utilizing a solid, or blank, distribution ring, fluid flowing from each hole will be directed to the same outlet port.

When a discharge hole has fully passed collector gap 112, flow no longer occurs through that hole. Since cylindrical wall 68 of piston cup 62 is flush with the inner periphery of ring 110, holes passing the collector gap are blocked or closed-off. Flow may continue to occur, however, through discharge holes formed vertically higher in piston cup wall 68, or stated another way, through holes spaced a greater distance from piston cup base 70 (see FIGS. 9-12).

FIGS. 4 and 6 illustrate a modified flow distribution ring 120. Ring 120 is suited for applications in which it is desired to use multiple outlets and to control the distribution of flow to each outlet. Twenty-four circumferentially spaced vertical outlet passages 122 are formed in ring 120. Passages 122 are closed at the upper extent of ring 120. Access holes 130 are drilled through the end of each outlet passage 122 that is to be utilized. Passages that are not to be used are simply left closed.

Radial slots formed over each passage 122, extending radially outwardly from an inner diameter 126 of ring, define individual collector gaps 128. The ring portions 132 surrounding each collector gap 128 are raised. Thus, flow into a particular collector gap 128 from a particular discharge hole 72 is directed through an access hole 130 into a particular outlet passage 122. There is no "mixing" as occurs in distribution ring 110 where a common collector gap and common outlet are utilized.

Radially outer wall 134 of ring 120 is flush with radially inner wall 136 of outlet body 48, preventing flow therebetween. Outlets (one of which is shown at 138) are formed in ring wall 134 in alignment with outlet ports 50 formed in the outlet body. Thus, a flow path is established from collector gap 128, through access hole 130, through outlet passage 122, through outlet 138, and finally, through outlet port 50.

Outlets 138 formed in ring 120 should correspond, both in size and alignment, with outlet ports 50. In an outlet body having only a small number of outlet ports, say four, the outlet ports will likely be of relatively large diameter. A corresponding outlet 138 formed in ring wall 134 may open as many as six outlet passages 122 to the same outlet port 50. In this example, flow would be distributed to four separate ports, with six outlet passages supplying each outlet port. In an outlet body utilizing the maximum 24 ports, each outlet port would be of small diameter. Thus, each outlet 138 formed in ring wall would open only one outlet 138 to each outlet port 50. Flow could be distributed to 24 separate outlet ports, with each outlet port being supplied by only one outlet passage.

Inlet port(s) 34 of inlet assembly 22 are connected to fluid conduit(s). Fluid flows through ports 34 and into piston cup 62. This creates a pressure differential between the inlet and outlet assemblies, causing vavle member 60 to move downward against the force of spring 104. Flow occurs through outlet port(s) 50 only when inlet pressure is sufficient to expose discharge holes 72 to the collector gap(s). At lower pressures, the device acts as a check valve, preventing flow between the inlet and outlet assemblies. The pressure required for flow to occur (i.e. to expose discharge holes to the collector gap) may be adjusted by varying the spring rate and/or the vertical location of discharge holes 72.

The key to controlling the amount of flow and the distribution of flow is the pattern of the discharge holes 72 formed in piston cup 62. Generally, the holes are arranged in vertically spaced rows extending around the circumference of cup 62. The amount of downward deflection of piston cup 62 at a particular pressure is easily determined. Of course, the amount of deflection at a particular pressure may be adjusted by varying the size and type of spring utilized. Thus, at a particular pressure, it is known which row of holes will be exposed to the collector gap. Accordingly, the number and size of holes in that role are determinative of the amount of flow occuring at that pressure.

If a common outlet port and blank distribution ring are used (FIGS. 1 and 5), the circumferential location of a particular hole in a row is of no moment. Flow from each hole all ends up at the same outlet port. If multiple outlet ports are used, the circumferential positioning of the holes is crucial. If flow is desired through a particular outlet port at a particular pressure, holes must be formed in the row corresponding to that pressure, and they must be positioned in circumferential alignment with the collector gap(s) that supplies the outlet port through which flow is desired.

Figure 9:
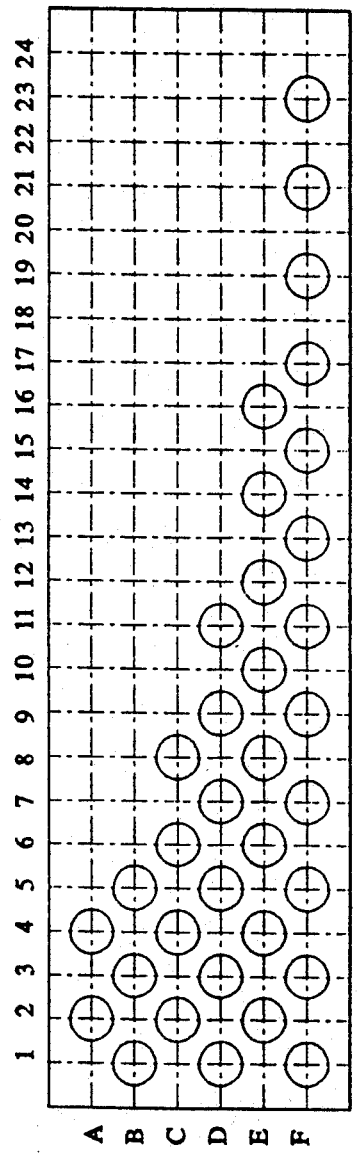
FIG. 9 is an unrolled surface view of a piston cup according to the present invention.
Figure 10:
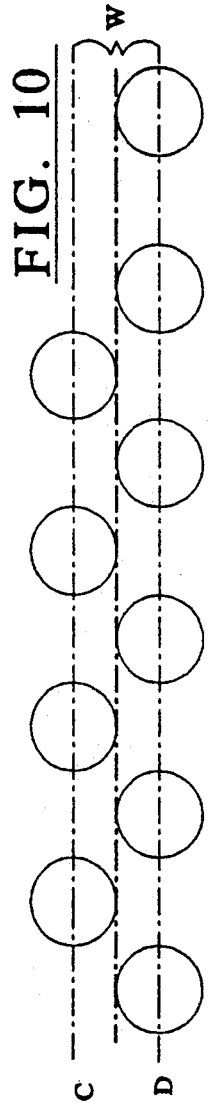
FIG. 10 is an exploded view of a portion of the piston cup of FIG. 9.
Figure 11:
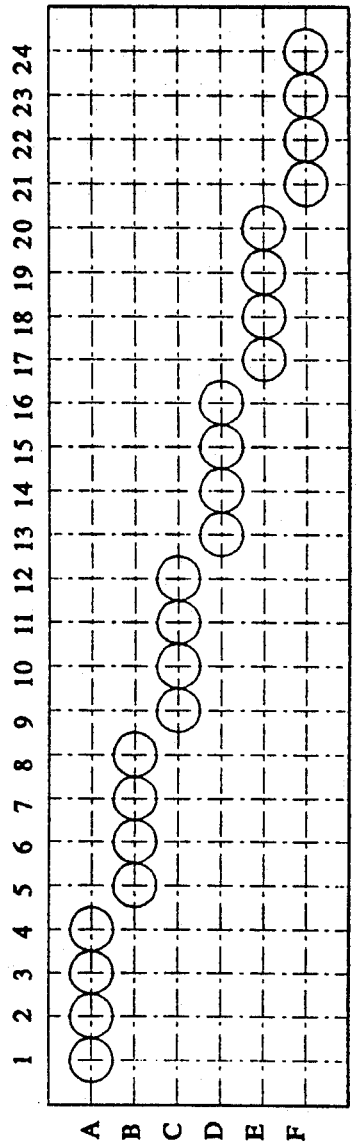
FIG. 11 is an unrolled surface view of a second embodiment of a piston cup according to the present invention.

FIGS. 9-11, corresponding to Examples 1 and 2 below, are examples of particular hole patterns that might be used. In each wall, cylindrical wall 68 of piston cup 62 has been "unrolled" into a flat, rectangular surface. The circles on the surface represent the locations of discharge holes. The surface has been marked with horizontal rows A-F and vertical columns 1-24 to facilitate reference to particular holes or groups of holes. Row F is the row closest to the bottom, or base, of the piston cup.

EXAMPLE 1—FIGS. 9 AND 10

FIG. 9 illustrates a hole pattern that may be used to obtain a constant amount of output flow while the input pressure is steadily decreasing. This pattern is particularly useful for applications such as the emptying of a tank. In this example output flow is through a common outlet port and a blank distribution ring (FIGS. 1 and 5) is utilized. Thus, only the number of holes per row—not their circumferential postioning—is of importance.

In a pattern designed to produce a constant output flow, it must be kept in mind that the flow rate per hole at higher input pressures is greater than the flow rate per hole at lower input pressures. Thus, more flow per unit of time occurs through a hole at a higher input pressure than would occur through the same hole at a lower input pressure. To achieve a constant amount of output flow at all pressures, a relatively greater number of holes must be used at lower pressures, and a relatively smaller number of holes must be used at higher pressures.

Referring to FIG. 9, row F is exposed to the collector gap at lower pressures (it is the closest row to the base of the piston cup and thus will be the first row exposed to the collector gap upon movement of the piston cup). At pressures lower than that necessary to move the piston cup downward a sufficient amount to expose row F to the collector gap, no flow will occur through the device. Row A is exposed to the collector gap at the highest pressures.

Assume that a constant flow rate of 24 gallons per minute is desired. To determine the number of holes per row necessary to achieve this, the flow rate per hole at pressures corresponding to the row locations must be calculated. Generally, higher rows will see more pressure and thus holes in that row will have higher flow rates. Once these calculations are made, dividing the constant flow rate desired by the flow rate per hole in a particular row will yield the number of holes needed in that row. Following are some sample figures to achieve a constant flow rate of 24 gallons/minute:

| Row | Flow Rate/Hole (gpm) | No. of Holes Required |
|-----|----------------------|-----------------------|
| A   | 12                   | 2                     |
| B   | 8                    | 3                     |
| C   | 6                    | 4                     |
| D   | 4                    | 6                     |
| E   | 3                    | 8                     |
| F   | 2                    | 12                    |

Thus, the pattern illustrated in FIG. 9 is arrived at. Of course, the number of holes required per row will not always be a whole number. A very constant rate of flow is still obtained if the number of holes required per hole is rounded to the nearest whole number.

A row of holes will not always be directly aligned with the collector gap. Parts of two different rows may be exposed to the collector gap. A fairly constant flow rate is still maintained, as long as the diameter of the discharge holes are equal to the width of the collector gap, and so long as the rows are vertically arranged such that the tops of the holes in each row touch the same line as the bottoms of the holes in the row above.

FIG. 10 is an enlarged view of rows C and D of FIG. 9. Collector gap "W" is illustrated, with the darkened parts of the holes being the portions exposed to the collector gap. It can be seen that the width of collector gap W is equal to the diameter of the holes C and D, and also that the tops of the holes in row D and the bottoms of the holes in row C touch the same line.

Approximately one-half of the area of the holes in row C is exposed to the collector gap, and approximately one-half of the area of the holes in row D is exposed to the collector gap. Thus, in row C, $4*\frac{1}{2}=2$ holes are exposed; and in row D, $6*\frac{1}{2}=3$ holes are exposed. The flow rate per hole at this level is somewhere between the flow rate per hole of row C (6 gpm), and the flow rate per hole of row D (4 gpm). For purposes of this example, we will approximate the flow rate at this level to be 5 gpm per hole. Thus, the total flow rate for row C is 2 holes*5 gpm per hole=10 gpm; and the total flow rate for row D is 3 holes*5 gpm per hole=15 gpm. The combined flow rate from both rows is 10+15=25 gpm, which is acceptably close to the desired constant output of 24 gpm.

EXAMPLE 2—FIG. 11

FIG. 11 illustrates a hole pattern that is used to "switch" output flow to different outlet ports at different pressures. A flow distribution with outlet passages formed therein, such as that shown in FIGS. 4 and 6, must be used in conjunction with this hole pattern. Six outlet ports are formed in the outer periphery. Six corresponding and circumferentially aligned outlets are formed in the flow distribution ring. As there are 24 outlet passages and 24 corresponding collector gaps, each outlet/outlet port is in communication with four outlet passages and four collector gaps.

Each row A-F in FIG. 11 contains a group of four discharge holes. The grouping of holes in each row is circumferentially offset from the circumferential locations of the hole groupings in other rows. Since it is desired to distribute flow to separate outlet ports, the location of the holes within a row, as well as the number of holes in the row, is important.

The piston cup is installed so that each group of four holes is aligned with one of the six outlet ports. As each outlet port is supplied by four collector gaps/outlet passages, each hole will be separately aligned with an individual collector gap. For example, the holes in positons 21-24 of row F will be aligned with four separate collector gaps, all of which will supply one outlet port. The holes in positions 17-20 of row E will be aligned with four different collector gaps, which supply a different outlet port.

At the highest pressures, the outlet port supplied by holes 1-4 of row A will be operative. As pressure decreases to expose row B to the collector gap level, output will switch to the outlet port supplied by holes 5-8 of row B. This process continues until the lower part of the pressure range is reached, when output will be through the outlet port supplied by holes 21-24 of row F.

The potential applications to which this line switching principle may be employed are virtually endless. One could switch output as desired between as few as 2 and as many as 24 outlet ports. Output need not be in a series fashion as shown in FIG. 11. It could switch back and forth between just two outlet ports. A lubricant supply could be attached to the inlet ports and distributed to as many as 24 bearings or machine parts in any sequence and amounts desired. A pattern could be devised to separate fluids in a tank of different specific gravities to separate outlet ports. The line switching and constant output patterns could be combined to produce constant flow to a series of ports.

With minor alterations, the device of the present invention may be utilized as a level gauge. As shown in FIG. 7, a diaphram 160 is clamped between the inlet assembly 162 and the outlet assembly 164. The diaphram is made of a stretchable material and is in place to prevent a loss of pressure between the inlet and outlet assemblies. Support 166 has been formed with steps 168 to accommodate a coiled spring 170.

Inlet port 172 of inlet assembly 162 is connected to inlet pressure from the bottom of a tank (not shown). Outlet port 174 of outlet assembly 164 is connected to the top of the tank if it is pressurized or under a vacuum. If the tank is open, outlet port 174 may also be open. Central port 176 is open if the tank is open, and plugged otherwise.

Diaphram 160 is also clamped between support 166 and piston 178. Piston 178 is forced downward in response to tank pressure received through port 172. Diaphram 160 stretches to maintain the pressure seal (FIG. 8). Piston travel is in direct relation to pressure differential, which is in direct relation to the level of fluid in the tank. An appropriately marked transparent scale positioned over inlet assembly 162 (with conversion of piston travel to tank fluid level) provides an indication of the level of fluid in the tank. Spring and diaphram selection are determined by the operating pressure.

Various features of the present invention have been explained with reference to the embodiments shown and described. It must be understood, however, that modification may be made without departing from the scope and spirit of the invention.

I claim:

1. A device for connection to a fluid supply comprising:

an inlet assembly having at least one inlet port adapted for connection to said fluid supply;

an outlet assembly attached to said inlet assembly and having at least one outlet port, a flow path being defined between said inlet port and said outlet port;

a valve member positioned between said inlet and outlet assemblies and in said flow path, said valve member movable between at least one closed position in which said valve member blocks said flow path and at least one open position in which said flow path is open, said valve member moving from said closed position toward said open position in response to increased differential pressure between said inlet and outlet assemblies, said valve member defining discharge holes which selectively permit communication between said inlet port and said outlet port when said valve member is in said open position;

biasing means positioned in said outlet assembly beneath said valve member to apply a biasing force to said valve member sufficient to move said valve member from said open position toward said closed position in response to decreased differential pressure between said inlet and outlet assemblies; and a cylindrical flow distribution ring seated within said outlet assembly and in said flow path, an upper extent of said cylindrical ring and a lower extent of said inlet assembly defining- a radial collector gap having a larger diameter than that of adjacent radial interior surfaces of said ring and said inlet assembly, said flow path being open when said valve member is in said open position and at least one of said discharge holes is exposed to said collector gap.

2. A device as recited in claim 1 wherein said valve member comprises a piston cup having a cylindrical wall attached to a base, said discharge holes being circumferentially spaced around said cylindrical wall in vertically displaced rows.

3. A device as recited in claim 1 wherein an annular space is defined by a radially outer surface of said flow distribution ring and a radially inner surface of said outlet assembly, said annular space being in said flow path and disposed between said collector gap and said outlet port.

4. A device as recited in claim 1 wherein a radially outer surface of said flow distribution ring abuts a radially inner surface of said outlet assembly, and a plurality of circumferentially-spaced vertical outlet passages are formed in said flow distribution ring, said vertical outlet passages being in said flow path and disposed between said collector gap and said outlet port.

5. A device as recited in claim 4 wherein 24 individual circumferentially-spaced collector gaps are formed between said upper extent of said ring and said lower extent of said inlet assembly, and 24 vertical outlet passages are formed in said ring, each of said outlet passages being connected to one of said collector gaps.

6. A device as recited in claim 5 wherein 24 outlet ports are formed in said outlet assembly, each of said outlet ports being connected to one of said vertical outlet passages.

7. A device as recited in claim 1 wherein the diameter of said discharge holes is equal to the width of said collector gap.

8. A device as recited in claim 4 wherein said valve member is positioned such that said discharge holes are in circumferential alignment with said vertical outlet passages.

9. A device as recited in claim 2 wherein said valve member further comprises a cylindrical sleeve attached to said piston cup, said sleeve extending above said piston cup into said inlet assembly and having a guide pin extending therethrough, said guide pin having a bulb formed at a radially inner extent and a key formed at a radially outer extent.

10. A device as recited in claim 9 wherein a vertical keyway is formed in a radially inner surface of said inlet assembly, said keyway receiving said key to prevent rotation of said valve member relative to said inlet and outlet assemblies.

* * * * *